US009212760B2

(12) United States Patent
Thorpe et al.

(10) Patent No.: US 9,212,760 B2
(45) Date of Patent: Dec. 15, 2015

(54) ROTARY ACTUATOR INTERFACE AND METHOD

(75) Inventors: Glenn W. Thorpe, Spring, TX (US); Richard A. Beers, Oklahoma City, OK (US)

(73) Assignee: JBT Products, Inc., Houston, TX (US)

( * ) Notice: Subject to any disclaimer, the term of this patent is extended or adjusted under 35 U.S.C. 154(b) by 634 days.

(21) Appl. No.: 13/179,858

(22) Filed: Jul. 11, 2011

(65) Prior Publication Data

US 2013/0015382 A1    Jan. 17, 2013

(51) Int. Cl.
*F16K 31/528*  (2006.01)

(52) U.S. Cl.
CPC ....... *F16K 31/5286* (2013.01); *Y10T 29/49412* (2015.01)

(58) Field of Classification Search
CPC .................... Y10T 29/49412; F16K 3/5286
USPC ............. 251/251, 252, 257, 258, 259, 129.11
IPC ............................ F16K 3/5286; Y10T 29/49412
See application file for complete search history.

(56) References Cited

U.S. PATENT DOCUMENTS

| 1,155,576 | A | * | 10/1915 | Isley | 251/229 |
| 1,891,533 | A | * | 12/1932 | Gish | 251/252 |
| 3,046,802 | A | * | 7/1962 | Cupedo | 74/110 |
| 3,492,880 | A | * | 2/1970 | Pearson | 74/57 |
| 4,293,117 | A | | 10/1981 | Mueller | |
| 4,350,322 | A | * | 9/1982 | Mueller | 251/229 |
| 4,648,534 | A | * | 3/1987 | Esser | 222/373 |
| 5,005,805 | A | | 4/1991 | Morris et al. | |
| 5,108,073 | A | | 4/1992 | Adachi | |
| 6,007,047 | A | * | 12/1999 | Phipps | 251/252 |
| 6,024,422 | A | * | 2/2000 | Drennen et al. | 303/115.2 |
| 6,534,793 | B1 | * | 3/2003 | Heritier-Best | 257/77 |
| 6,769,665 | B2 | | 8/2004 | Silva et al. | |
| 6,971,628 | B2 | | 12/2005 | Ichimaru | |
| 7,007,922 | B2 | | 3/2006 | Biester et al. | |
| 7,654,164 | B2 | * | 2/2010 | Biester et al. | 74/57 |
| 2005/0218359 | A1 | * | 10/2005 | Davis et al. | 251/29 |
| 2006/0237675 | A1 | * | 10/2006 | Telep et al. | 251/129.11 |

* cited by examiner

*Primary Examiner* — John K Fristoe, Jr.
*Assistant Examiner* — Daphne M Barry
(74) *Attorney, Agent, or Firm* — Streets & Steele; Patrick K. Steele; Jeffrey L. Streets

(57) ABSTRACT

A rotary actuator (10) rotates a drive shaft (40), which in turn rotates a stem (76) between an actuator housing (32) and a central body (48). Drive pins (50, 52) extend between the central body of a rotary sleeve (42), and move within helical guide slots (80, 82) to linearly raise and lower the central body (48), which is connected to the linear controller (18).

20 Claims, 3 Drawing Sheets

US 9,212,760 B2

ROTARY ACTUATOR INTERFACE AND METHOD

FIELD OF THE INVENTION

The present invention relates to an interface between a rotary actuator and a control device having a linear controller. More particularly, the actuator rotates a drive shaft between circumferentially spaced limits to control movement of the linear controller, which for example may be a rising stem of a valve.

BACKGROUND OF THE INVENTION

Various types of interfaces between a rotary actuator and a linear controller have been devised. Rotary actuators are preferred for many applications due to their high reliability and relatively low cost. An interface may include a rising stem with a valve member at the lower end thereof, and the interface converts the rotation of the rotary actuator to raising and lowering the stem and thus moving the valve member on or off its seat.

While the rotary actuator may be relatively simple and reliable, the interface between the rotary actuator and the control device in many cases is not sufficiently rugged for field applications, including oilfield applications. Some interfaces are not suitable for corrosive environments which may accompany the application, while other actuators do not provide sufficient bearing support or weatherproofing for long term use.

A rotary actuator for raising and lowering a valve stem is disclosed in U.S. Pat. No. 6,007,047. U.S. Pat. Nos. 4,293,117 and 4,350,322 each disclose an actuator for a plug valve. U.S. Pat. No. 5,005,805 discloses a lift-turn actuator for a tapered plug valve, and U.S. Pat. No. 5,108,073 discloses an actuator for the reciprocation of a valve stem of a butterfly valve. U.S. Pat. No. 7,007,922 discloses a regulating device and actuator to convert linear movement to rotational movement.

A direct acting electrically operated actuator is disclosed in U.S. Pat. No. 6,971,628 which avoids the conversion of rotary motion to linear motion. U.S. Pat. No. 6,769,665 discloses an electric valve actuator with a failsafe device.

The disadvantages of the prior art are overcome by the present invention, an improved rotary actuator interface is hereinafter disclosed.

SUMMARY OF THE INVENTION

In one embodiment, an interface is provided between a rotary actuator for rotating a drive shaft between limits spaced less than 360° apart and a control device having a linear controller. The interface includes a housing with a generally cylindrical interior chamber, and a central body within the housing and interconnected with the linear controller. A plurality drive pins each extend radially between the central body and a rotary sleeve, which is positioned radially between the housing and the central body. The rotary sleeve has a plurality of guide slots each for receiving a respective one of the drive pins, with the guide slots each being helical such that rotation of the sleeve results in linear motion of the central body. One or more bearings in the housing guide rotation of the rotary sleeve relative to the housing, and a connector interconnects the central body and the linear controller.

These and further features and advantages of the present invention will become apparent from the following detailed description, wherein reference is made to the figures in the accompanying drawings.

DETAILED DESCRIPTION OF PREFERRED EMBODIMENTS

Figure 1:
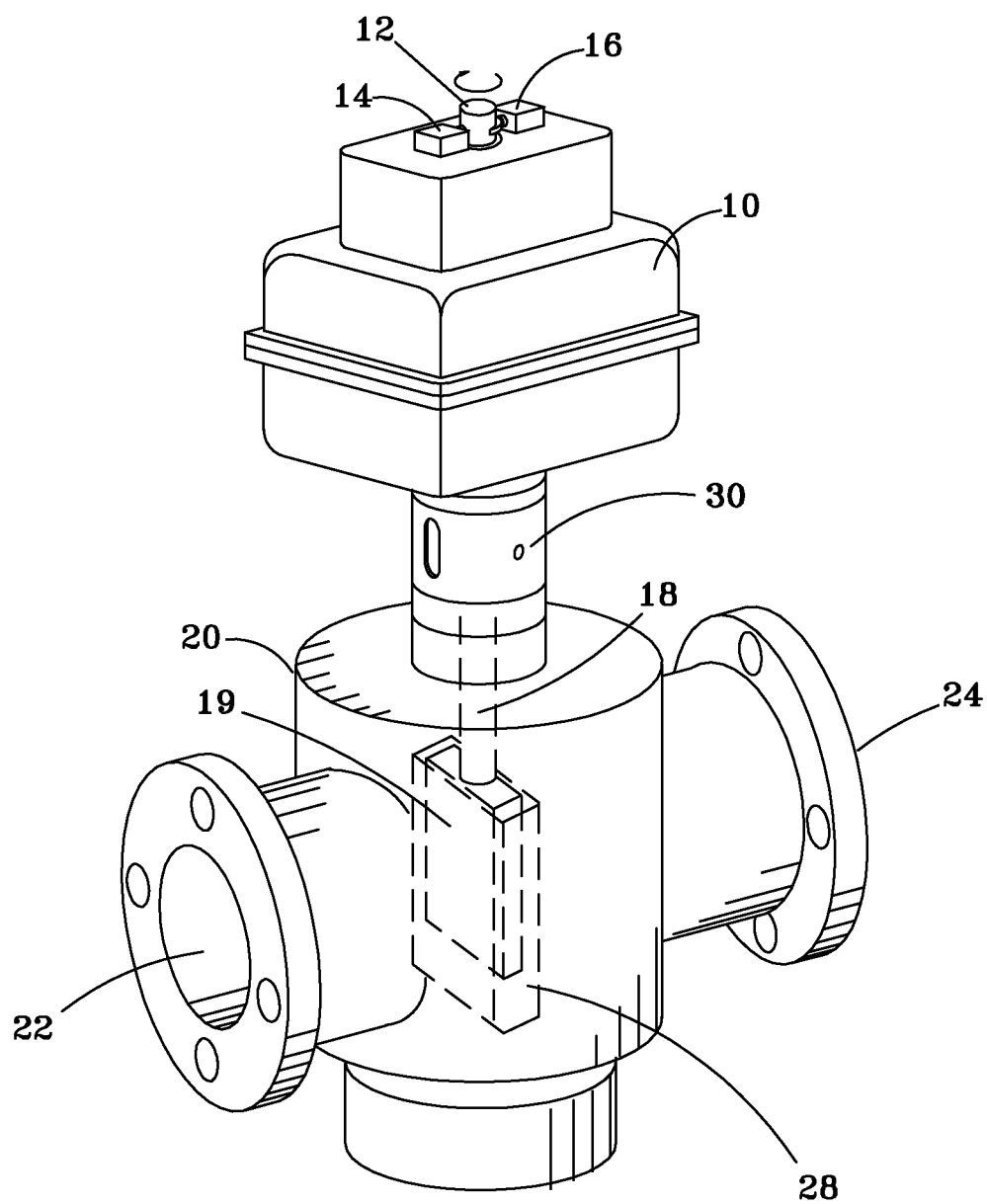
FIG. 1 is a simplified perspective view of a rotary actuator, an interface, and a valve with a rising stem.

FIG. 1 illustrates a suitable application for an actuator interface. Actuator 10 may be of various types commonly available in the oil and gas industry for controlling valves or regulators, and may be electrically or hydraulically powered. The actuator 10 has a central drive shaft which rotates between limits spaced less than 360° apart, and exemplary limits 14 and 16 are shown in FIG. 1 for limiting rotation of shaft 12. Those skilled in the art will appreciate that the limits 14, 16 and the stem 12 are shown at the upper end of the actuator 10 in FIG. 1 for clarity, and in many applications the limits 14, 16 are contained within the actuator housing. The actuator shaft 12 rotates within the housing, but may not extend above the top of the housing.

Rotary actuator 10 is thus of the variety that does not rotate multiple turns in order to achieve actuation. Some rotary actuators have limits spaced at 90°, and are commonly referred to as quarter-turn actuators. The actuator as disclosed herein may rotate the actuator shaft between limits spaced 90° apart, 180° apart, 270° apart, or any other desired circumferential spacing. The amount of rotation thus affects the linear movement of the linear controller. Alternatively, the rotator shaft may rotate more than 360°, e.g., 720°, so that the desired axial movement of shaft 12 is obtained with relatively low frictional torque losses.

The valve 20 shown in FIG. 1 is a simplified control device having a rising stem 18 which controls the flow of fluid from inlet port 22 to outlet port 24. The valve body includes an internal chamber 28 with a valve member 19 at a lower end of the stem for engagement with a conventional seat (not shown) to close off flow through the valve. Actuator 30 thus physically and functionally acts as an interface between the rotary actuator 10 and the control device 20 having a linear controller 18.

Figure 2:
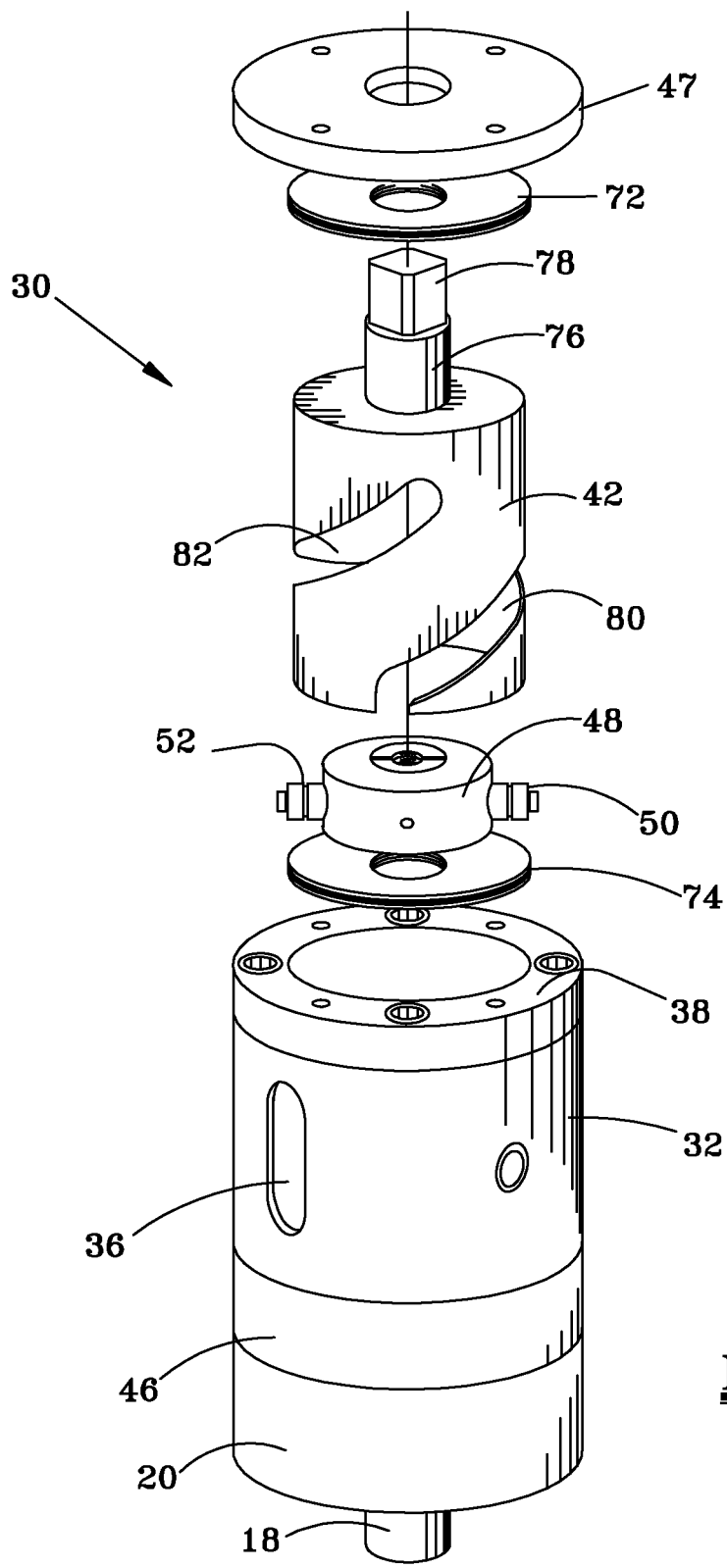
FIG. 2 is a exploded view of the components of the actuator shown in FIG. 1.

Referring now to FIG. 2, the interface 30 generally shown in FIG. 1 is shown in greater detail in an exploded view. The interface includes a top cap 47 which may be bolted to upper ring plate 38, which is bolted or otherwise secured to housing 32. Bearings 72 and 74 may be in the form of needle bearings which primarily absorb thrust loads. The rotary output from the actuator 10 is thus mechanically coupled to central pin 76, which has an upper portion 78 with flats for engagement with corresponding surfaces on the rotary output from the actuator. Rotary sleeve 42 is secured to the actuator pin. Central body 48 is positioned within the central cavity in the rotary sleeve 42, with the rotary sleeve including a pair of helical slots 80, 82 each for receiving a respective one of the pins 50, 52 extending from the central body 48. Pins 50, 52 also fit within a respective vertical slot 34, 36 in the housing 32, thereby causing axial movement of central body 48 upon rotation of sleeve 42. The pins 50, 52 may move axially but not rotationally with respect to the housing 32. The amount of vertical movement of the central body is thus a function of the circumferential rotation of the sleeve 42 and the inclination of the slots 80, 82. A lower ring-shaped member 46 serves as a base to support the lower bearing 74 and the rotary sleeve 42, while face place 20 is provided for mounting to the control device, and has a central aperture for receiving the axially movable shaft 18.

The actuator uses two guide pins 50, 52 extending through helical slots in the rotary sleeve, and the guide pins preferably are 180° apart so that unbalanced forces are minimized, thereby substantially contributing to the reliable operation of the interface. The critical components of the interface by thus all centered within the housing to reduce undesirable side forces or tilting forces.

Figure 3:
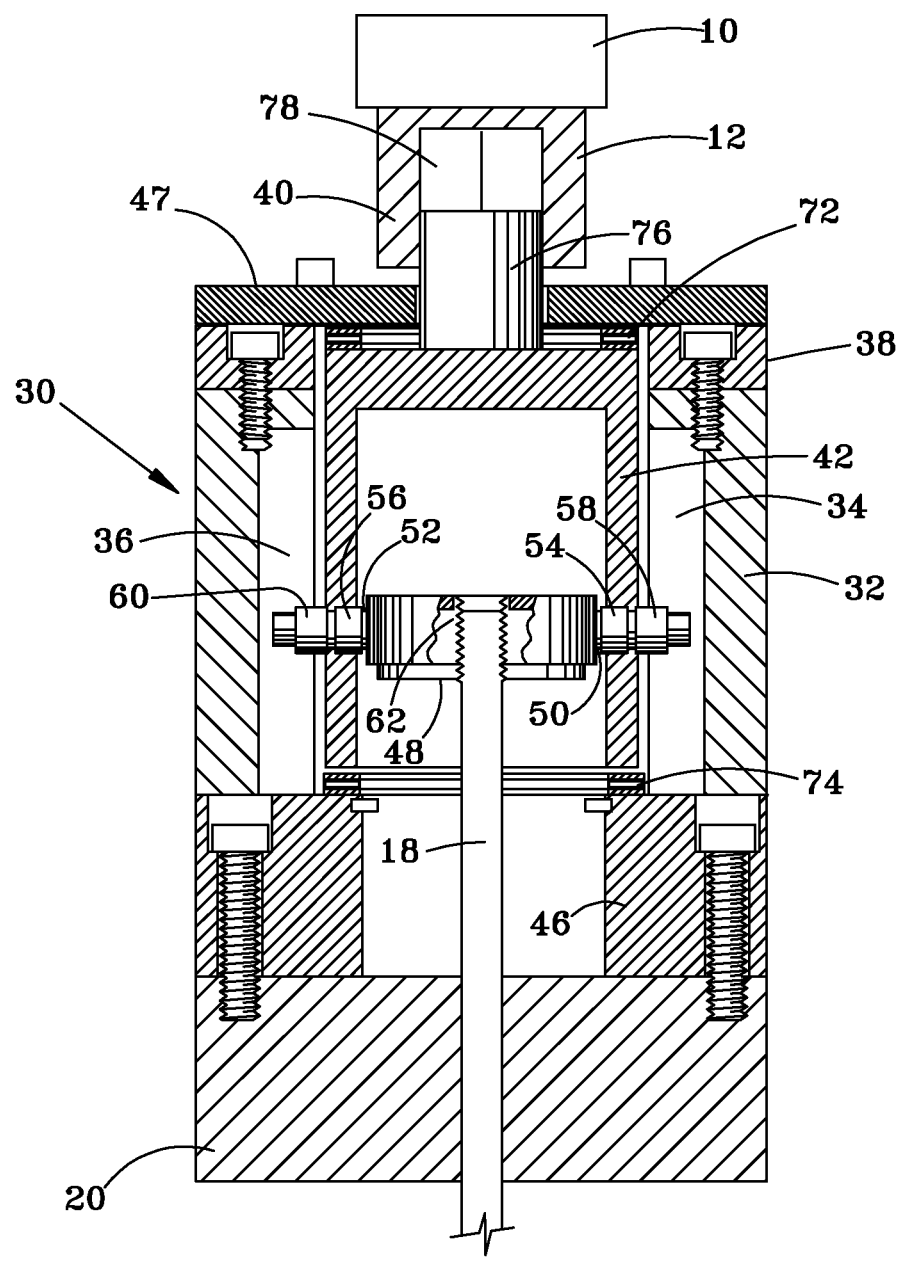
FIG. 3 is a cross-sectional view of an interface illustrating a portion of a simplified rotary actuator.

FIG. 3 is a cross-sectional view of the interface 30, and shows the assembled condition of the interface with upper bearing 72 positioned between top cap 47 and rotary sleeve 42, and lower bearing 74 positioned between ring 46 and the lower end of rotary sleeve 42. Ring shaped plate 38 is functionally part of the housing 32. Shaft 40 from rotator 10 is thus coupled to and rotates with pin 76 and sleeve 42. The cross-section of FIG. 3 is taken through the slots 34, 36 in the housing 32, and the pins 50, 52 extend through the helical slots in the rotary sleeve and into the vertical slots in the housing 36, thereby rotationally connecting the inner body 48 with the housing. Pin 50 may contain a brass roller 54 or another guide or roller 58 for sliding engagement with the walls of one of the helical slots and one of the housing slots 34, 36, while the opposing side of the central body contains a similar brass roller 56 and roller 60 for sliding within the opposing slots. The linear controller 18 as shown in FIG. 3 may be a valve stem, or may be coupled to the valve stem. In either event, linear controller 18 may be threaded as 62 or otherwise secured to the central body 48, so that vertical movement of the central body moves the linear controller 18 a predetermined amount.

The actuator as disclosed herein is preferably powered, and electrically powered, hydraulically powered, and pneumatically powered actuators are well known in the art. The interface as disclosed herein may control various types of valves, including gate valves and globe valves. Other devices which use a linear controller may also be controlled with an actuator interface, including, for example, louvers and regulators. The actuator interface is particularly suitable for rotating a valve in an oilfield or chemical operation due to its ruggedness and highly repetitive actuation. Also, the interface is able to generate an axially downward force in excess of a 1000 pounds to keep a valve fully closed.

A feature of the invention is that the upper and lower bearings are captured within the housing, thereby protecting the bearings from environment outside the interface and capturing the bearings for controlled radial movement while in use. Bearings other than needle bearings may be used. Friction reducing members other than brass or bronze rollers may be used for engaging side walls of the helical slots in the rotary sleeve or the vertical slots in the housing.

The helical slots may have a non-uniform angle, with a relatively low angle in the bottom of the slots for creating significant axial forces, and the angle of the slots increasing as a control member rises in response to the actuator. Depending on the application, other systems may benefit from a high angle slot in the bottom of each helical slot, with a lower angle slot at the upper end of each helical slot. To facilitate disassembly of the actuator, it may be seen in FIGS. 2 and 3 that the bottom of the helical slots are open to the bottom of the rotary sleeve, so that the rotary sleeve can be removed from the housing with the central member pins remaining in the vertical slots in the housing. Alternatively, the bottom of each helical slot may be closed to minimize radial spreading of the rotary sleeve, in which case the central body may be retrieved with the rotary sleeve during disassembly of the interface.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus to serve as an interface between a rotary actuator and a controlled device having a linearly reciprocatable controller connectable to the apparatus, the apparatus comprising:

a housing having a cylindrical interior chamber having a first diameter surrounded by an interior wall having a plurality of vertical slots extending parallel to an axis of the cylindrical interior chamber in length and radially outwardly from the axis of the cylindrical interior chamber in depth, the housing being securable to the controlled device to operate the linearly reciprocatable controller thereof;

a central body received within the cylindrical interior chamber of the housing to reciprocate along the axis of the cylindrical interior chamber, the central body having a plurality of pins secured thereto and corresponding in number to the plurality of vertical slots in the interior wall of the housing, each pin extending radially outwardly from the central body to the interior wall surrounding the cylindrical interior chamber of the housing, and each pin terminating in one of the corresponding plurality of vertical slots in the housing, the central body being connectable to the linearly reciprocatable controller of the controlled device at a connecter; and a rotatable sleeve having a second diameter, that is at least 80% as large as the first diameter, positioned radially between the interior wall of the cylindrical interior chamber of the housing and the central body, the rotatable sleeve being secured within the cylindrical interior chamber of the housing by an upper thrust bearing and a lower thrust bearing to prevent axial movement of the rotatable sleeve within the cylindrical interior chamber of the housing, the rotatable sleeve having a drive shaft coupled to a first end of the rotatable sleeve and a plurality of helical guide slots within the rotatable sleeve, each to receive one of the plurality of pins of the central body therethrough, the plurality of helical guide slots of the rotatable sleeve each having a helical path relative to the axis of the cylindrical interior chamber of the housing;

wherein the application of torque and clockwise rotation of the drive shaft coupled to the rotatable sleeve rotates the rotatable sleeve and the plurality of helical guide slots therein, through one revolution or less, to engage and move the plurality of pins, the central body within the cylindrical interior chamber and the connecter in a first direction along the axis of the cylindrical interior chamber to operate the linearly reciprocatable controller of the controlled device;

wherein the application of torque and counterclockwise rotation of the drive shaft coupled to the first end of the rotatable sleeve rotates the rotatable sleeve and the plurality of helical guide slots therein to move the plurality of pins, the central body within the cylindrical interior chamber and the connecter in a second direction along the axis of the cylindrical interior chamber to operate the linearly reciprocatable controller of the controlled device;

wherein the rotary actuator engages the drive shaft of the rotatable sleeve; and wherein the rotary actuator imparts purely rotational displacement to the drive shaft of the rotatable sleeve.

2. The apparatus of claim 1, wherein each of the plurality of pins extending from the central body and terminating in the vertical slots of the housing includes a sleeve-shaped roller secured to each of the plurality of pins to rollably engage one or more sidewalls of one of the plurality of helical guide slots of the rotatable sleeve into which each of the plurality of pins and the sleeve-shaped roller are received, and to rotate on each of the plurality of pins.

3. The apparatus of claim 1, wherein the rotatable sleeve has a cylindrical interior surface slidably and reciprocatably receiving the central body;

wherein the cylindrical interior surface of the rotatable sleeve has a third diameter that is also at least 80% as large as the first diameter.

4. The apparatus of claim 1, wherein each of the plurality of pins extending from the central body includes a low friction member to engage side walls of one of the plurality of helical guide slots of the rotatable sleeve into which each of the plurality of pins is movably received.

5. The apparatus of claim 1, wherein each of the plurality of pins extending from the central body extends into one of the vertical slots in the interior wall of the housing to prevent rotation of the central body about the axis of the cylindrical interior chamber as the central body reciprocates within the housing and in response to application of torque to the drive shaft.

6. The apparatus of claim 1, wherein the one or more thrust bearings include:

an upper thrust bearing engaging an upper surface proximal the first end of the rotatable sleeve; and a lower thrust bearing engaging a lower surface distal to the first end of the rotatable sleeve;

wherein the upper thrust bearing engages the upper surface proximal the first end of the rotatable sleeve to prevent axial movement of the rotatable sleeve during rotation of the rotatable sleeve in a first direction to displace the central body away from the upper surface to displace the linearly reciprocatable controller of the controlled device away from the upper surface; and wherein the lower thrust bearing engages the lower surface distal to the first end of the rotatable sleeve to prevent axial movement of the rotatable sleeve during rotation of the rotatable sleeve in a second direction opposite to the first direction to displace the central body toward the upper surface to displace the linearly reciprocatable controller of the controlled device toward the upper surface.

7. The apparatus of claim 1, wherein each of the plurality of helical guide slots of the rotatable sleeve include an opening at an end of each of the plurality of helical guide slots to receive one of the plurality of pins extending radially outwardly from the central body;

wherein the rotatable sleeve is removable from the cylindrical interior chamber of the housing with the central body and the plurality of pins extending therefrom remaining in the cylindrical interior chamber of the housing by moving the rotatable sleeve to guide each of the plurality of pins through the opening at the end of each of the plurality of helical guide slots into which one of the plurality of pins is received.

8. The apparatus of claim 1, wherein the pitch of each of the plurality of helical guide slots relative to the axis of the cylindrical interior chamber of the housing varies along each of the plurality of helical guide slots;

wherein rotation of the drive shaft coupled to the first end of the rotatable sleeve at a constant angular velocity results in a varying rate of the linear movement of the connecter used to couple the central body to the linearly reciprocatable controller.

9. The apparatus of claim 1, wherein the housing comprises a cylindrical outer configuration.

10. The apparatus of claim 1, wherein the plurality of pins extending radially outwardly from the central body comprise a pair of opposed pins.

11. The apparatus of claim 1, wherein the rotatable sleeve has an inverted cup-shape including a bottom perpendicular to the axis of the cylindrical interior chamber of the housing to which the drive shaft is coupled, and further including downwardly extending sidewalls including the plurality of helical guide slots.

12. An apparatus to interface between a rotatable actuator and a controlled device having a linearly reciprocatable controller, the apparatus comprising:

a housing having a cylindrical interior chamber having a first diameter;

a central body reciprocatably received within the cylindrical interior chamber of the housing and having a central body centerline that is aligned with the linearly reciprocatable controller of the controlled device;

a plurality of pins each extending radially outwardly from the central body and into a corresponding plurality of vertical slots in the interior wall surrounding the cylindrical interior chamber of the housing, each of the plurality of vertical slots being aligned with the central body centerline and formed in an interior wall of the cylindrical interior chamber of the housing, each pin terminating within one of the plurality of vertical slots in the interior wall of the housing;

a rotatable sleeve having a second diameter that is at least 80% of the first diameter positioned radially between the interior wall of the cylindrical interior chamber of the housing and the central body, the rotatable sleeve having a plurality of helical guide slots each for receiving a pin therethrough, the helical guide slots each being helical such that rotation of the rotatable sleeve results in linear motion of the plurality of pins and the central body;

an upper thrust bearing and a lower thrust bearing disposed within the housing to permit rotation of the rotatable sleeve and to prevent axial movement of the rotatable sleeve relative to the housing; and a connecter on the central body for coupling the central body to the linear controller;

wherein a single rotation of the rotatable sleeve produces sufficient axial displacement of the central body to stroke the linearly reciprocatable controller.

13. The apparatus of claim 12, wherein each of the plurality of pins extending radially outwardly from the central body includes a roller for rollably engaging sidewalls of a corresponding one of the plurality of helical guide slots and for rotating about-the plurality of pins.

14. The apparatus of claim 12, wherein the one or more thrust bearings include:

an upper thrust bearing to engage and prevents the axial movement of an upper surface of the rotatable sleeve; and a lower thrust bearing to engage and prevents the axial movement of a lower surface of the rotatable sleeve;

wherein the upper thrust bearing prevents axial movement of the rotatable sleeve during operation of the apparatus to move the central body in a direction away from the upper surface of the rotatable sleeve; and wherein the lower thrust bearing prevents axial movement of the rotatable sleeve during operation of the apparatus to move the central body in a direction toward the upper surface of the rotatable sleeve.

15. The apparatus of claim 12, wherein each of the plurality of helical guide slots of the rotatable sleeve has an end wall entry for receiving one of the plurality of pins, such that the rotatable sleeve may be removed from the housing while the central body and the plurality of pins extending therefrom remain in the housing.

16. The apparatus of claim 12, wherein the pitch of each of the helical guide slots is non-linear, such that rotation of the drive shaft on the rotatable sleeve at a constant angular velocity results in a varying rate of movement of the linearly reciprocatable controller.

17. The apparatus of claim 12, wherein the plurality of pins connected to and extending from the central body comprise a pair of circumferentially opposed pins, thereby reducing non-axial forces between the pair of circumferentially opposed pins and the plurality of vertical slots in the interior wall of the housing in which the pair of circumferentially opposed pins are received.

18. A method of interconnecting a rotatable actuator for rotating a drive shaft and a controlled device having a linearly reciprocatable controller, the method comprising:

providing a housing having a cylindrical interior chamber surrounded by an interior wall and having a first diameter;

movably positioning a central body within the cylindrical interior chamber of the housing;

connecting the central body to the linearly reciprocatable controller of a controlled device;

providing a plurality of pins each extending radially outwardly from the central body, each of the plurality of pins passing through one of a plurality of helical guide slots in a rotatable sleeve having a second diameter that is at least 80% as large as the first diameter and disposed intermediate the central body and terminating within one of a plurality of vertical slots in the interior wall of the housing that parallel an axis of the cylindrical interior chamber in which the central body is movable;

rotating the rotatable sleeve within the cylindrical interior chamber of the housing using a rotary actuator to turn a drive shaft connected to the rotatable sleeve and to thereby move the plurality of pins and the central body within the cylindrical interior chamber of the housing to operate the linearly reciprocatable controller of the controlled device; and wherein the application of torque and clockwise rotation of the drive shaft coupled to the rotatable sleeve rotates the rotatable sleeve and the plurality of helical guide slots therein, through one revolution or less, to engage and move the plurality of pins, the central body within the cylindrical interior chamber and the connector in a first direction along the axis of the cylindrical interior chamber to operate the linearly reciprocatable controller of the controlled device.

19. The method of claim 18, wherein each of the plurality of pins extends into one of the plurality of vertical slots in the interior wall of the housing to limit movement of the plurality of pins and the central body to linear motion.

20. The method of claim 19, further comprising the step of varying the pitch of the helical slots within the rotatable sleeve;

wherein rotation of the drive shaft on the rotatable sleeve at a constant angular velocity results in varying the rate at which the linearly reciprocatable controller is moved.

* * * * *